United States Patent [19]

Keifert et al.

[11] 4,030,849

[45] June 21, 1977

[54] LINED EQUIPMENT AND METHOD OF FABRICATION

[75] Inventors: Hibbard G. Keifert, Torrance, Calif.; Frank J. Waters, deceased, late of Northridge, Calif., by Ethel M. Waters, administratrix

[73] Assignee: Fansteel Inc., North Chicago, Ill.

[22] Filed: Oct. 18, 1976

[21] Appl. No.: 733,244

[52] U.S. Cl. .................... 403/272; 228/165
[51] Int. Cl.² .......................... F16B 5/08
[58] Field of Search ............... 52/758 B; 228/165; 285/286; 403/270–272; 220/1 B, 3, 75, 76; 138/142, 143

[56] References Cited

UNITED STATES PATENTS

| | | | |
|---|---|---|---|
| 3,443,306 | 5/1969 | Meyer | 228/165 |
| 3,457,961 | 7/1969 | Long | 220/3 |

*Primary Examiner*—John E. Murtagh
*Attorney, Agent, or Firm*—Barnes, Kisselle, Raisch & Choate

[57] ABSTRACT

An improved composite wall construction and method for fabrication or repair of equipment having layered metals forming a corrosion resistant liner on a structural metal backing which includes fusion welding the abutting ends of the backing metal to an interposed base strip, bridging these ends and welds with an inlay strip of liner material underlying the ends of the liner material, and fusion welding the ends of the liner material to each other and to the inlay strip.

11 Claims, 11 Drawing Figures

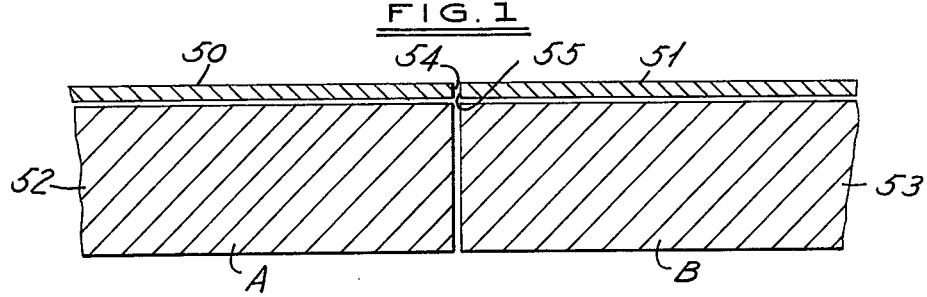
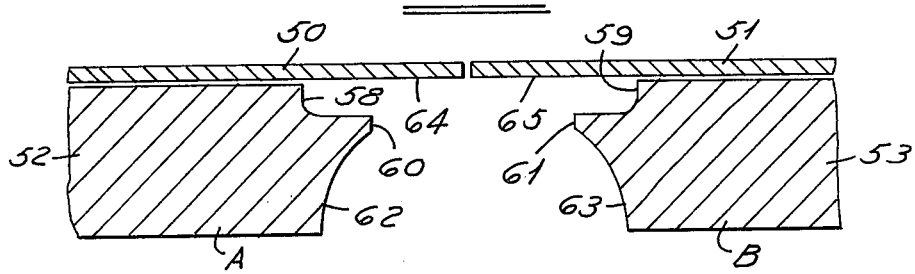
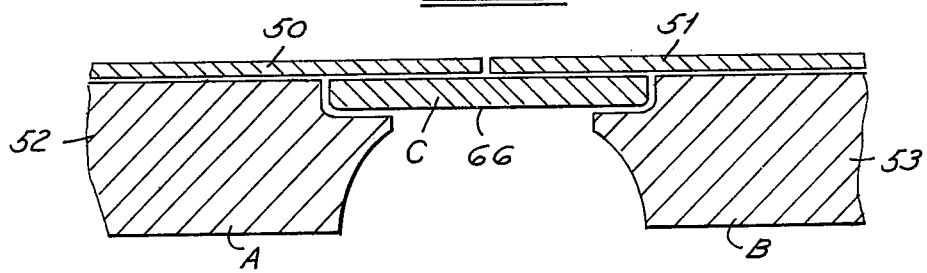
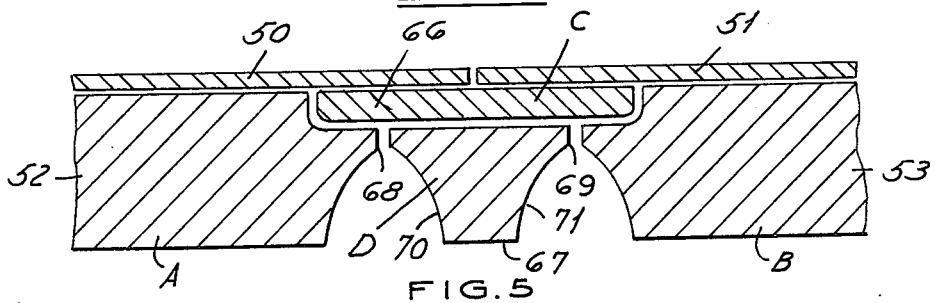
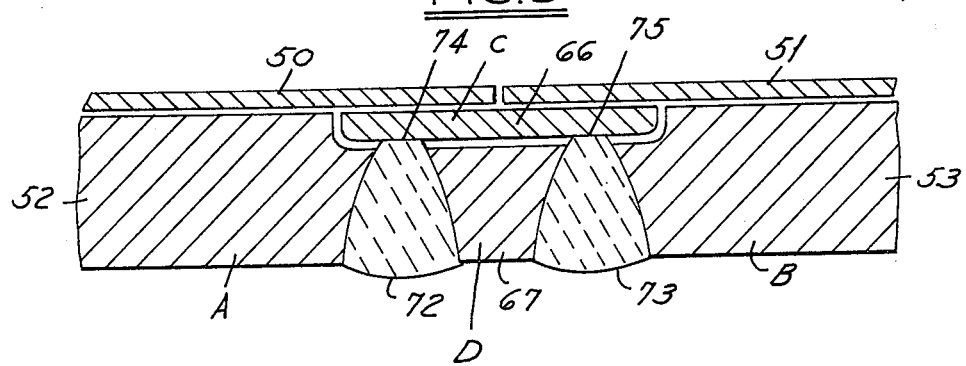

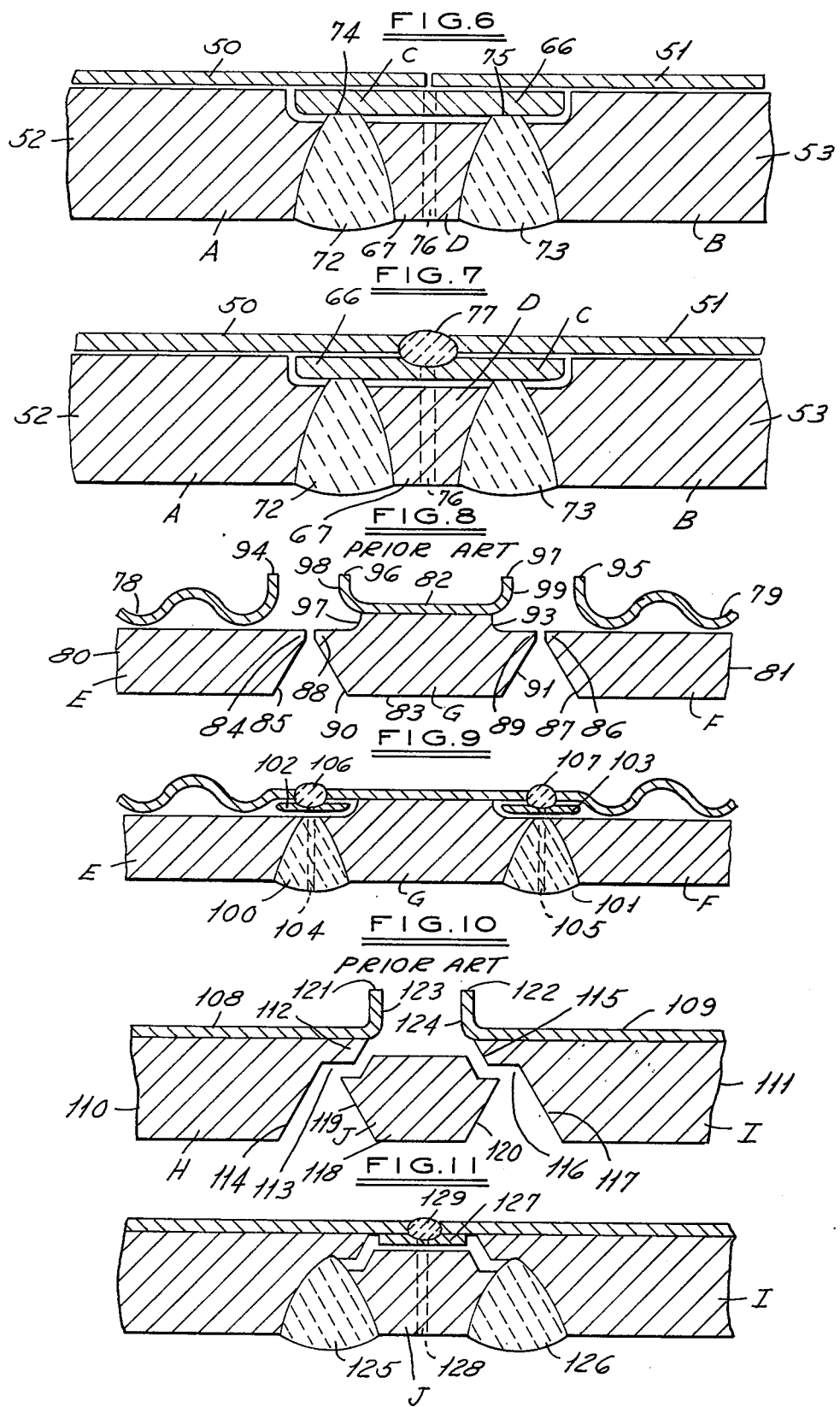

LINED EQUIPMENT AND METHOD OF FABRICATION

This invention covers an improved welded wall assembly and method of constructing it in the fabrication of industrial equipment that has walls comprised of two or more layers of materials, especially for chemical process equipment.

The method relates to improvements in welded joints in equipment in which a surface layer of a special purpose metal or alloy, such as a metal having high corrosion resistance, is used in conjunction with a backing of a more common base metal. The invention especially relates to improved wall constructions with a surface liner or facing of a dissimilar material to that of the backing material, particularly to cases where the facing material is not generally metallurgically compatible with the backing material.

The improved method of fabrication of this invention can be applied to a large number of dissimilar metal combinations. These combinations include refractory and reactive metals, or their alloys, as liners or facings on backing materials such as mild steel, stainless steel, copper-base alloys, nickel-base alloys, and cobalt-base alloys. The improved method can be applied with only slight modifications to wall assemblies where the special purpose metal is metallurgically bonded to the backing, or where the liner is unbonded to the backing.

Special purpose metal or alloy layers on a more common base metal substrate are well known in the art and have been used for many years. One general area where such dissimilar metal combinations have been employed is in chemical process equipment. Here it is typical practice to use a relatively thin layer of the special purpose metal or alloy to provide resistance to chemical attack, and use a lower cost, more common base metal as the structurally supporting backing. The fabrication of such equipment can present severe problems, especially when the lining material is metallurgically dissimilar from the backing material. For instance, consider a tantalum layer on a mild steel backing. Tantalum has a melting point about 3000° C. (5430° F.), while mild steel melts at about 1530° C. (2790° F.); mild steel has a coefficient of thermal expansion about twice that of tantalum; and iron and tantalum react at a sufficiently high temperature to produce the brittle intermetallic compound $TaFe_2$ and eutectics of this compound and the terminal iron-rich and tantalum-rich solid solutions (see "Columbium and Tantalum," by F. T. Sisco and E. Epremian, published by John Wiley and Sons, Inc., 1963).

A principal object of this invention is to provide an improved method for fabrication of a composite wall assembly comprised of a fushion welded thin layer of a special purpose metal or alloy such as a refractory metal, or reactive metal, or their alloys, and a fusion welded iron-base or non-ferrous base metal on which the facing may either be metallurgically bonded or unbonded.

A further object is to provide a simplified method for wall fabrication of equipment having a special purpose metal or alloy liner and a more common base metal backing to improve the fitup of both members of the wall when the liner of special purpose metal is either metallurgically bonded or unbonded to the substrate.

An additional object is to provide an improved method of fabrication to produce sound, high quality, contamination-free, butt welds having a smooth, relatively distortion-free surface in both layers.

A further object is to provide an improved method of fabrication of a wall comprised of combinations of dissimilar metals or alloys so as to achieve a final welded assembly that will not have surface projections or irregularities such as batten straps, especially on the process side of chemical process equipment.

These and other objects provided by this improved method of fabrication will be apparent to those skilled in the art by the following description of drawings and a preferred embodiment of the invention.

FIGS. 1 through 7 show the steps in sequence used in preparing the facing and base metal and in making the fusion welds in these materials.

FIGS. 8 and 9 show the fabrication steps for one method used in the prior art.

FIGS. 10 and 11 show the steps for a second method of the prior art.

These methods of the prior art have some similarity to the wall construction method of this invention, but they have deficiencies that are overcome in the wall construction of this invention.

An example of the method of this invention is given as a specific embodiment in which a tantalum material is employed as a corrosion resistant facing material on a mild steel backing material. Tantalum-lined or clad materials have been used in a wide variety of chemical process applications where tantalum provides corrosion resistance to the severe corrosive environment. Because of the high cost of tantalum, such composite wall constructions are used in equipment to provide a tantalum lining to resist the corrosion conditions and a lower cost base metal, commonly mild or plain carbon steel, as the structural member or backing material in the wall. Some typical equipment used in the chemical process industry employing these combination of materials include: thermowells, bayonet heaters, various condensers and heat exchangers, vessels, piping, valves and fittings.

In the specific embodiment described in the example, the lining is usually either commercially pure, unalloyed tantalum, or it may be a tantalum alloy such as Fansteel 63 Metal manufactured by Fansteel Inc. The Fansteel 63 Metal contains 2.5 weight percent tungsten, 0.15 weight percent columbium, balance essentially tantalum as discussed in commonly assigned U.S. Pat. No. 3,592,639. This tantalum alloy material has an ultimate tensile strength about 50 percent higher and yield strength about twice that of unalloyed tantalum at a temperature about 200° C. (390° F.), which temperature is experienced in some chemical process applications. The corrosion resistance of this alloy has been shown to be at least equal to pure tantalum in many environments.

Although the lining materials is described as unalloyed tantalum or Fansteel 63 Metal in the preferred embodiment, it should be readily apparent that the wall construction and methods of fabricating it, as described in this invention, can be equally well applied when the facing material is essentially any ductile, fabricable and weldable, refractory metal or alloy, including other tantalum-base alloys, columbium and columbium-base alloys, and vanadium and vanadium-base alloys, or the reactive metals titanium, zirconium, and hafnium, and their alloys.

The specific embodiment of the wall construction that is described employs mild steel as the backing material. Again, backing materials that can be utilized in wall constructions of this invention can be one or more layers of a number of common base metals, such as other fabricable and weldable steels, including stainless steels, copper-base, nickel-base, and cobalt-base materials; or the backing material can be a refractory metal or reactive metal, or their alloys, having a composition different from that of the facing material.

Description

FIG. 1 shows member A having an unbonded facing (or liner) 50 of Fansteel 63 Metal and a mild steel substrate 52 to be joined to member B having a tantalum material facing 51 and mild steel substrate 53. The space shown between facings 50 and 51 and the substrates 52 and 53 is simply to designate that these members are unbonded but in mechanical contact. The abutting edges 54 and 55 of the facing and 56 and 57 of the steel substrate of the two members are first prepared parallel and properly aligned for the two members.

The steel substrate in each member is then machined as illustrated in FIG. 2 to provide opposed grooves or channels 58 and 59 in the two members, root faces 60 and 61, and groove faces 62 and 63 in the members in preparation for fusion welding of the steel backing.

The specific joint geometry used for making the fusion welds in the steel backing is in accordance with "Recommended Proportions for Grooves for Arc Welding," Welding Handbook, Sixth Edition, Section One, American Welding Society. The welding procedure used for the steel backing is in accordance with the recommended practice given in the same reference in order to produce code quality welds.

All contaminants such as steel chips, oil and grease, or other soils must thoroughly be removed from both members by techniques such as solvent degreasing.

The lining or facing material must also be chemically cleaned before welding. In the case where the liner or facing material has been bonded to the steel shell, it is necessary to remove any iron that may be embedded or encapsulated along surfaces 64 and 65 of the liner material formerly bonded to the steel.

Next, an inlaid insert 66, also designated member C, of unalloyed tantalum or tantalum alloy of essentially the same composition as facings 50 and 51 is prepared to fit and telescope in the opposed grooves 58 and 59 when the machined and cleaned members are brought together as illustrated in FIG. 3.

A machined intermediate filler base insert member D, as illustrated in FIG. 4, designated as 67 is placed between members A and B. This base insert 67 is preferably of steel and has machined root faces 68 and 69 and groove faces 70 and 71.

Then, steel fusion welds 72 and 73 are made conventionally except that the tantalum material insert 66 bridges the welds and acts as a backer at the root 74 of the steel weld 72 and at the root 75 of the steel weld 73. Since the tantalum material has a much higher melting point than steel, there is essentially no alloying between the tantalum and steel at the weld root interfaces 74 and 75.

The weld reinforcement on the face side of the steel weld may or may not be machined or ground smooth with the outer surface of the steel. Normally the steel fusion butt weld will be inspected for quality by X-ray techniques, and any defective areas will be repaired before proceeding to the next step.

Purge holes 76 are drilled as illustrated in FIG. 6 through the steel insert 67 (member D), and tantalum inlay or insert 66 (member C). Normally, the purging holes are left open even after completing the entire welded wall assembly, since the holes then serve a second purpose of being used for leak detection during service.

The final step in completing the welded wall assembly is to make the weld 77, shown in FIG. 7, joining edges 54 and 55 of facings 50 and 51, respectively, as a smooth butt weld. Usually it is preferable to have sufficient depth of fusion such that weld 77 also bonds the facings to the tantalum material insert 66. Additional filler material of the same tantalum material composition may be added in making the weld 77, if required. In some cases where the tantalum alloy liner or layer is thin, such as 0.040 inches or even thinner, the edges 54 and 55 of facings 50 and 51 may be bent upward to provide a lip which when melted down in the subsequent welding will provide at least a portion of filler material for the joint.

In welding tantalum materials, adequate cleaning of the materials and shielding of the weld area with inert gas is mandatory. Such refractory metal materials can be successfully fusion welded using techniques such as inert gas shielded tungsten arc welding, or electron beam welding. The inert gas shielded tungsten arc welding (often called TIG or GTA welding) is the most commonly used procedure, and is used in the embodiment described. The region of the tantalum alloy material to be welded is evacuated and purged with an inert gas, generally argon, but the inert gas can be any one or a mixture of inert monatomic gases, such as argon, helium, neon, krypton or xenon.

If feasible, the entire assembly to be welded can be placed in a chamber which is evacuated and back-filled with the inert gas. Alternately, a plastic bag or sheet can be taped to the liner or facing of both members A and B. A hose is fitted into the bag to inflate and purge the bag and the areas to be welded. An additional hole in the bag permits any residual air to exit, and the flow of argon is continuous so as to purge out any residual contaminants. In addition, argon gas is put through purge holes 76 to provide protection at the root side of the weld in the tantalum layers. The welding torch is inserted into an additional hole in the bag to make the weld in the tantalum alloy material. This procedure can be used to generate a good quality, complete penetration butt weld 77 as illustrated in FIG. 7.

A completely welded wall assembly made following the steps as described shows a relatively smooth and flush surface on the tantalum layer side, which is desirable to avoid projections or irregularities on the chemical process side. Both the tantalum alloy weld and the steel welds can be readily tested by penetrant dye inspection and X-ray radiographs for presence of any defects in these welds. Such inspections should show a sound and defect-free wall assembly.

The sequences of steps illustrated by the Figures, and embodiment described cover the preferred process in which the steel welds are made before making the weld in the tantalum material liner. Other sequences of steps can be used in producing the final wall assembly shown in FIG. 7, such as by making the weld on the tantalum alloy side first before making the welds on the steel side; however, this practice has been found to result in subsequent distortion, typically exhibited as puckering, in the tantalum alloy layer.

The fabrication process of this invention can be used to assemble a wall where the tantalum alloy material is bonded (not shown) to the steel substrate on one or both of the members to be joined. The principal additional precaution that must be observed in this case is that sufficient tantalum must be removed from the underside of the tantalum material layers as shown as 64 and 65 in FIG. 2 to remove any areas of iron or other foreign metallics before the tantalum material is welded.

The methods for bonding the liner to the backing include the explosive cladding process (such as Detaclad process, trademark of E. I. duPont de Nemours, and Company), roll bonding the liner to the backing, and brazing the liner to the backing such as with silver brazing alloys. At the bond interface of explosively clad tantalum to mild steel, the bonded interface between these two materials frequently show a wave-like appearance in the microstructure, sometimes with particles of steel encapsulated in the tantalum at the interface. It is necessary that these areas of steel be removed from the tantalum layer before making the weld in the tantalum layer in order to obtain sound, high-quality, corrosion-resistant welds.

The wall construction and method for fabrication of this invention can be applied to a wall assembly having more than two materials in the layers. It can, as an additional embodiment, be applied to a triclad wall construction comprised of a layer of tantalum explosively bonded to a layer of copper explosively bonded to steel. In this case, layers of copper and iron are considered the first layer and the layer of tantalum is regarded as the second layer. In making the fusion welds as described in the wall assembly, copper is removed from areas where the steel welds or tantalum welds are made.

Comparison to State-of-the-Art

FIGS. 8 and 9 illustrate a wall construction and method we have used for several years to bond members having thermal expansion compensated liners of tantalum or Fansteel 63 Metal on the interior and steel on the exterior of chemical process equipment such as vessels, towers and piping. The two members to be joined, E and F, each have a thermal expansion compensated liner 78 and 79, respectively, and a steel shell 80 and 81, respectively, in the two members. Member G having an explosively bonded liner 82 of tantalum or Fansteel 63 Metal on a steel substrate 83 is used as a filler piece in the wall assembly. The steel is prepared for welding by machining a root face 84 and groove face 85 in member E, and root face 86 and groove face 87 in member F in accordance with the American Welding Society recommendations for groove proportions. Corresponding root faces 88 and 89 and groove faces 90 and 91 are prepared on member G. Grooves 92 and 93 are machined along the interface of liner 82 on member G as further illustrated in FIG. 8. The edge 94 of liner 78 of member E and edge 95 of liner 79 of member F, and edges 96 and 97 of liner 82 of member G are next prepared so that edges 94 and 96 will be flush when bent in contact, and also edges 97 and 95, when they are bent in contact. Any iron contamination is removed from surfaces 98 and 99 on the underside of facing 82.

Next, as illustrated in FIG. 9, fusion butt welds 100 and 101 are made to join the steel base material of member E to member G, and member G to member F, respectively. Then, any excess weld metal at the root of welds 100 and 101 is ground flush, and any steel chips or other soils are removed by solvent cleaning. Next, inserts 102 and 103 of the same tantalum material as the facing are placed in the positions as illustrated in FIG. 9. Insert 102 is centered under edges 94 and 96, which are bent into flush contact with insert 102; and insert 103 is centered under edges 97 and 95, which are bent into flush contact with insert 103. However, before these edges are bent down, purge holes 104 are drilled through steel weld 100 and tantalum material insert 102, and purging holes 105 are drilled through steel weld 101 and tantalum material insert 103. Then, after thoroughly cleaning, the tantalum welds 106 and 107 are made by TIG welding under inert conditions similar to the procedure described in the embodiment of this invention.

Comparing the improved wall construction of this invention as illustrated in FIG. 7 with the state-of-the-art construction shown in FIG. 9, the distinctions between the two methods and the improved wall assembly of this invention are apparent. The method of this invention provides a much more simple fabrication method and much improved fitup, as well as a stronger assembly.

FIGS. 10 and 11 show a method of wall assembly used for several years in joining members that have bonded tantalum material liners. This method is illustrated in FIG. 10 in which member H has an explosively clad tantalum alloy layer 108 and member I has a bonded layer 109 on steel substrates 110 and 111, respectively. A relatively complex machined configuration is required in preparing the steel members for fusion welding as also illustrated in FIG. 10. This is shown as surfaces 112, 113 and 114 on member H, and surfaces 115, 116 and 117 on member I. An insert member J, shown as 118, has a machined configuration shown as 119 and 120 to provide grooves for joining members H to J, and J to I, respectively. The facing 108 on member H and the facing 109 of member I are bent upward, and the edges 121 and 122, respectively, on the two members are prepared so that they will be essentially flush contact when they are bent downward again. Any areas of contaminations by oils or iron or other foreign materials that may exist along the formerly bonded interfaces 123 and 124 must be removed before welding on the tantalum alloy side.

The finished wall assembly is shown in FIG. 11. Fusion butt welds 125 and 126 join steel members H to J, and J to I, respectively. Then, a tantalum material insert 127 is placed on top of member J, and purge holes 128 are drilled through member J and tantalum alloy insert 127. After removing any steel chips or other soils, the tantalum material weld 129 is made under inert conditions to complete the welded wall assembly.

In comparing this method of state-of-the-art wall assembly in FIG. 11 to the wall assembly of this invention in FIG. 7, the improvements can be noted. The steel welds in FIG. 11 each have a notch which creates a defect similar to a crack at the root of each weld. By contrast, in the improved method the steel welds have complete penetration against the tantalum alloy insert 66. The improved method provides much simpler machining and much greater ease of fitup, providing a much sounder, higher quality, final wall assembly.

Fabricating a wall of this invention has been illustrated by using specific types of materials by way of example, but the wall construction is not limiting since the method and the wall construction described can be applied to a broad spectrum of materials as covered by the claims.

We claim:

1. A wall assembly joint formed between abutting ends of layered elements each comprising a layer of first metallic material and a layer of second metallic material to face-to-face relation,
   a. an intermediate filler member of first material interposed between the ends of the layered elements of first material and fusion welded to each of said ends,
   b. an inlaid insert of second material underlying the abutting ends of the layered elements of second material, and bridging said fusion welds between the filler base member and the layered elements of first material, and
   c. a fusion weld joining the abutting ends of the layered elements of second material and the inlaid insert of second material to provide a relatively smooth surface in the second layer.

2. A wall assembly as defined in claim 1 in which the fusion welds between said filler member and said layered elements of first material abut at their roots to said inlaid insert of second material.

3. A wall assembly according to claim 1 in which the first metallic material is selected from metals and alloys comprising titanium, zirconium, hafnium, tantalum, columbium, vanadium, iron-base, nickel-base, cobalt-base and copper-base materials, and the second metallic material is selected from metals and alloys comprising titanium, zirconium, hafnium, tantalum, columbium and vanadium.

4. A wall according to claim 1 in which the layer of first material is an iron-base alloy and the layer of second metallic material is a tantalum-base material.

5. A wall according to claim 1 in which the layer of first material is comprised of a layer of copper bonded to mild steel and the layer of second material is a tantalum-base material.

6. A method of fabricating a wall which includes a layer of first metallic material and a layer of second metallic material, each layer having one face in a face-to-face relation with a face of the other layer, comprising the steps of:
   a. abutting an edge of two members of the wall, each member having a layer of first material and a layer of second material,
   b. machining the first layer of each member in preparation for welding of said members to a machined filler base insert of first material placed between the members of the first layer,
   c. machining a channel in the first layer of each member adjacent to the interface with the second layer,
   d. inlaying an insert of second material in the channel in the first material,
   e. fusion welding the first layer of the members to the insert of first layer of material, the roots of said welds abutting to the inlaid insert of second material, and
   f. fusion welding, under inert conditions, the layers of second material of the two members to each other.

7. A method of fabricating a wall according to claim 6 in which the fusion weld joining the layers of second material of the two members is joined to the inlaid insert of second material.

8. A method of fabricating a wall according to claim 6 in which the welds in the second layer are made before the welds in the first layer.

9. A wall assembly according to claim 6 in which the first metallic material is selected from metals and alloys comprising titanium, zirconium, hafnium, tantalum, columbium, vanadium, iron-base, nickel-base, cobalt-base and copper-base materials, and the second metallic material is selected from metals and alloys comprising titanium, zirconium, hafnium, tantalum, columbium and vanadium.

10. A method of fabricating a wall according to claim 6 in which the layer of first material is an iron-base alloy, and the layer of second metallic material is a tantalum-base material.

11. A method of fabricating a wall according to claim 6 in which the layer of first material is comprised of a layer of copper bonded to mild steel, and the layer of second material is a tantalum-base material.

* * * * *